Dec. 22, 1959     W. D. NOVAK     2,917,928
ROTARY MOTION STORAGE DEVICE

Filed Dec. 31, 1956     2 Sheets-Sheet 1

INVENTOR.
WARREN D. NOVAK
BY
*H. S. Mackey*
ATTORNEY

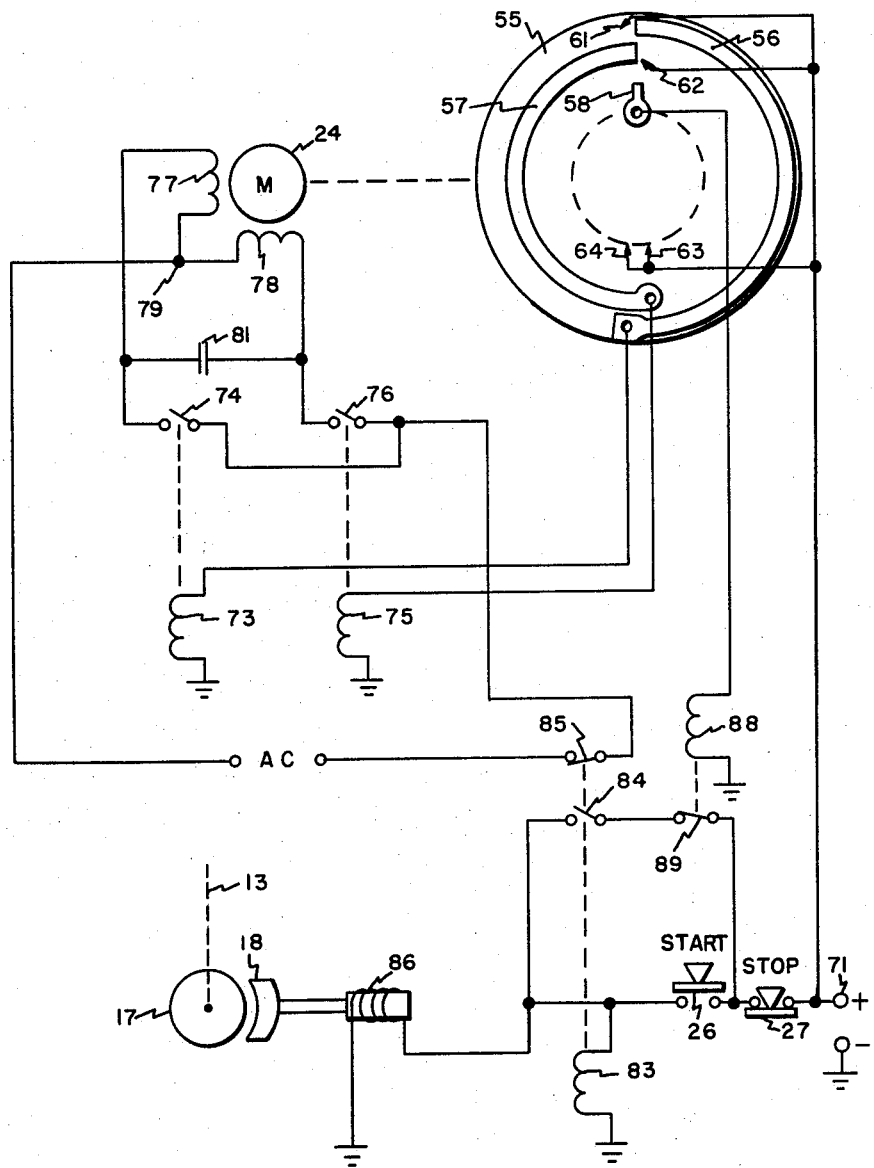

United States Patent Office 2,917,928
Patented Dec. 22, 1959

2,917,928

ROTARY MOTION STORAGE DEVICE

Warren D. Novak, Chappaqua, N.Y., assignor to General Precision Laboratory Incorporated, a corporation of New York Application December 31, 1956, Serial No. 631,837

4 Claims. (Cl. 74—1)

This invention relates to apparatus for storing rotary motion and for subsequently delivering the exact number of revolutions stored.

In many phases of industry it is desirable to maintain an accurate count of the number of revolutions of a shaft and this may be done conveniently with a revolution counter suitably geared to the shaft. It is often desirable to stop the operation of the counter temporarily in order to make computations or to insert corrections without losing track of the information which is being supplied continuously by the input shaft. Thus there is needed a device capable of accepting and storing shaft revolutions and for subsequently delivering the stored revolutions to the counter. A number of such devices have been proposed in the past but none has been entirely satisfactory because of large size, difficulty of manufacture, or short life.

It is a general object of this invention to provide a device for storing angular motion and for subsequently delivering the exact amount of motion stored.

A more specific object is to provide an improved mechanical unit for a motion storage device which is compact, easy to manufacture, and long lived.

The invention will be described with the aid of the accompanying drawing in which:

Figure 3 is a schematic diagram of the electrical connections.

Figure 1:
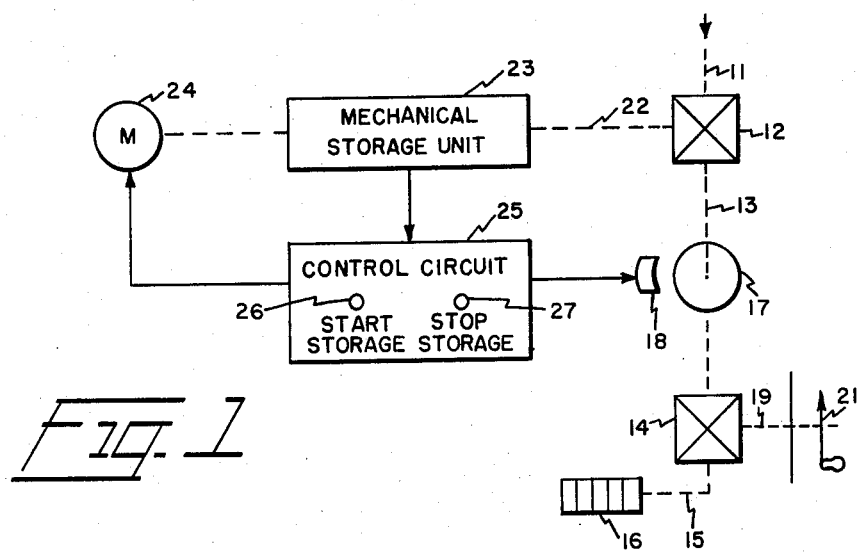
Figure 1 is a schematic diagram showing the cooperation of the mechanical storage unit with other elements of the system.

Referring first to Fig. 1, there is shown an input shaft 11 which is the source of revolutions to be counted. The shaft 11 is connected to one terminal of a conventional mechanical differential 12 the output of which appears on shaft 13 which in turn is connected to a second mechanical differential 14. The output shaft 15 of this differential is connected to a conventional mechanical revolution counter 16. Normally, the third shafts of each of the differentials 12 and 14 remain stationary so that the input revolutions of shaft 11 merely pass through the differentials 12 and 14 and are counted by the revolution counter 16.

The shaft 13 carries a brake drum 17 cooperating with which is a brake shoe 18 which may be pressed against the drum 17 in order to prevent the shaft 13 from rotating. The third shaft 19 of the differential 14 is connected to a hand wheel 21 so that when the shaft 13 is held stationary the indication of counter 16 may be corrected without affecting the shaft 11. The third shaft 22 of the differential 12 is connected to a mechanical storage unit 23 which is the heart of the present invention and which will be described in detail in connection with Fig. 2. The shaft 22 also carries an electric motor 24 which returns the shaft 22 to its original position at the end of the storage operation. The mechanical unit 23 includes electrical contacts which are connected to a control circuit 25 for the purpose of controlling the operation of the motor 24 and the brake shoe 18. The circuit 25 includes two push buttons 26 and 27 for the purpose of starting and stopping the storage operation.

In normal operation the revolutions of shaft 11 are passed directly to the revolution counter 16. When it is desired to stop the counter 16, the start button 26 is momentarily depressed which causes the brake shoe 18 to make contact with the brake drum 17 thereby stopping the shaft 13. The revolutions from shaft 11 will then flow through the shaft 22 to mechanical storage unit 23. At this time the motor 24 is not energized and merely rotates idly. While the shaft 13 is stationary, corrections may be made in the indication of the counter 16 by means of the hand wheel 21.

Figure 2:
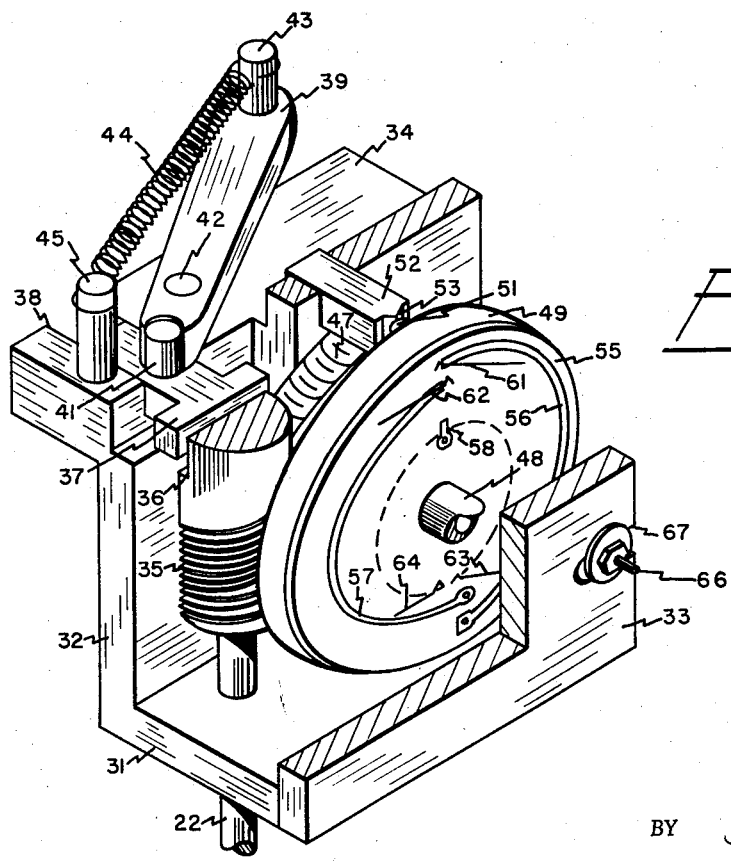
Figure 2 is an isometric view of the mechanical storage unit with certain parts cut away.

The mechanical storage unit 23 is shown in detail in Fig. 2 wherein there is shown a frame comprising a base 31 having two upstanding portions 32 and 33. The upright portion 32 carries a shelf 34 and the upper portions of upright members 32 and 33 are bridged by a cover portion which is not shown in the drawing in order that the remaining parts can be seen more clearly. The input shaft 22 is journalled both in the base 31 and in the cover portion and includes an enlarged portion on which is formed a worm 35. Just above the worm portion, the enlarged shaft is cut away parallel to its axis for a short distance to form a flat cam surface 36. A metal T-bar 37 cooperates with the flat cam portion 36 and slides in a groove 38 in shelf 34. A lever 39 has a forked end which engages a pin 41 fastened to the top of the T-bar 37. The lever 39 is pivoted about a pin 42 supported by the shelf 34 and also carries an upright pin 43 at the end opposite the fork. A spring 44 connects the pin 43 with another upstanding pin 45 which is fastened to the front portion of the shelf 34.

In the position of the parts shown in Fig. 2, the shaft 22 is in its reference position. The spring 44, through the lever 39, urges the T-bar 37 against the flat cam surface 36 thereby holding the shaft in this position. The positions of the pins and the pivot point are selected so that when the shaft 22 is rotated in either direction the T-bar 37 will be driven to the left as shown in the drawing sufficiently to cause the spring 44 to pass over the pivot point 42 so that the T-bar 37 will be urged by the spring far enough away from the flat cam surface 36 to clear it entirely thereby allowing the shaft 22 to rotate freely. At this time the back end of the lever 39 will come to rest against the upright frame member 32.

The worm 35 engages a worm gear 47 carried by a hollow shaft 48 journalled in the upright members 32 and 33 at right angles to the shaft 22. The shaft 48 also carries a metal disc 49 and this disc in turn carries a small cam 51 which, in the position of the parts shown in Fig. 2, appears at the top of the disc 49. A toggle return bar 52 slides in a groove cut in the upright member 32 and is also partially supported by a corresponding groove in the cover (not shown). The end of the bar 52 nearest the observer has a cam follower portion 53 formed on its end which appears, at the scale of Fig. 2, to be a sharp edge but which in reality is curved. In the reference position of the shafts, the cam 51 bears against the cam follower 53 and urges the bar 52 to the left.

In the operation of the apparatus so far described, rotation of the input shaft 22 in either direction causes the T-bar 37 to move to the left and causes the spring 44 to pass over the pivot point 42 thereby snapping the lever 39 against the upright 32 and the T-bar 37 to the left far enough to clear the enlarged portion of the shaft 22 as previously explained. At the same time that shaft 22 is rotating, the disc 49 will also rotate sufficiently to allow the cam 51 to move away from the cam follower 53 so that when the lever 39 moves to the right, it can move far enough to remain in a stable position. Subsequently, when the motor drives shaft 22 back again, the disc 49 will approach the position shown in the drawing at which time the cam 51 will engage the cam follower 53 thereby pushing the bar 52 to the left which in turn will push the lever 39 past the dead center position causing the T-bar 37 to engage the flat cam 36 and return the shaft 22 to its reference position.

The disc 49 has cemented to one face a disc of insulating material 55 on which are printed two approximately semi-circular copper segments 56 and 57. The upper ends of each of these segments lie on the same radius. Also on this same radius, but nearer to the shaft 48, is a small printed circuit pad 58. Electrical connections to the segments 56 and 57 and to the pad 58 may conveniently be made by flexible leads passing through holes in the disc 49 and then through a hole in the side of the shaft 48 so that the leads protrude through the axial hole in the shaft 48 on the side of the apparatus away from the observer. Two small brushes 61 and 62 cooperate respectively with the segments 56 and 57. In the reference position, as shown in the drawings, neither of these brushes make contact with its associated segment but a very small rotation of the shaft 48 will cause one or the other of these brushes to make contact depending upon the direction of the rotation. On the opposite side of the shaft 48 are two more brushes 63 and 64 so placed as to make contact with the pad 58 when the shaft 48 has rotated approximately 180°.

The brush 63 is supported by a machine screw 66 which is mounted by means of insulating washers in a slot 67 of the upright member 33. Electrical connection may therefore be made to the machine screw 66 and, at the same time, the brush may be carefully positioned by sliding the screw 66 in the slot 67. Each of the remaining brushes 61, 62 and 64 is similarly mounted in a portion of the upright member 43 which has been cut away in the drawing. The brushes 61 and 62 serve to establish either forward or reverse connections for the motor while the brushes 63 and 64 constitute limit switches which prevent the shaft 48 from rotating more than approximately one half of a revolution.

In one specific embodiment the ratio between the worm 35 and the worm gear 47 was made 40:1. Therefore, the small size required of the cam 51 and the cam follower 53 might be thought to constitute a source of excessive wear but this is not the case since very little force is required for the bar 52 to push the lever 39 over the dead center position. For example, the cam 51 may be made with a tip radius of 0.004 inch while the cam follower 53 may be made with a tip radius of 0.010 inch, and a model made with these dimensions has proved to operate very satisfactorily and to have an extremely long life.

Referring now to Fig. 3, the disc 55 is shown with its segments 56 and 57 and its pad 58. The brushes 61, 62, 63 and 64 are shown schematically in this view to improve the clarity. All four brushes are connected together electrically and to a source of control power schematically indicated by the positive terminal 71. The commutator segment 56 is connected to a relay 73 which has one set of normally open contacts 74. The segment 57 is similarly connected to a relay 75 which also has a set of normally open contacts 76. The motor 24 is shown as a two phase alternating current motor having two windings 77 and 78, one terminal each of which are connected together to the junction 79 and the other terminals of which are bridged by capacitor 81. The common junction 79 is connected to one terminal of the source of alternating current while the other terminals are connected respectively to the contacts 74 and 76.

The source of control power 71 is connected through a normally closed push button stop switch 27 and through a normally open push button start switch 26 to a relay winding 83 which operates a set of normally open contacts 84 and a set of normally closed contacts 85. A solenoid 86 is connected in parallel with relay winding 83, and when energized urges the brake shoe 18 against the brake drum 17. The pad 58 of the commutator is connected to a relay winding 88 which operates a set of normally closed contacts 89. The junction of the switches 26 and 27 is connected through the contacts 89 and the contacts 84 to the relay winding 83. The second terminal of the alternating current source is connected through the normally closed contacts 85 to both the contacts 74 and 76.

In the position of the parts shown in Fig. 3, the apparatus is in its reference position and no revolutions are stored. Also, it will be noted that no current flow even though both sources of power are connected. When it is desired to start storage, the push button 26 is momentarily depressed thereby energizing relay winding 83 which seals itself in through the normally closed contacts 89 and the now closed contacts 84. At the same time, the solenoid 86 is energized thereby stopping the rotation of the shaft 13. The contacts 85 are also opened thereby disconnecting one terminal of the alternating current source. When the disc 55 rotates slightly, the brush 61 or the brush 62, depending upon direction of rotation, will make contact with its associated segment thereby energizing either the relay 73 or the relay 75, thus establishing either forward or reverse connections for the motor 24. However, the motor is not energized at this time since the contacts 85 are open. When it is desired to terminate the storage operation the switch 27 is depressed momentarily thereby opening the circuit to the relay 83 and allowing it to drop out. As the relay 83 drops out, the contacts 85 reclose thereby energizing the motor through whichever of the switches 74 or 76 was previously closed. The motor will then drive the apparatus back towards its reference position and when it has nearly reached this position the brush 61 or 62 will leave its segment thereby deenergizing the motor. At about the same time, the bar 52 (Fig. 2) will push the lever 39 past dead center thereby returning the input shaft 22 to precisely its initial position.

If storage operation is initiated and the operator neglects to push the stop storage button 27, the apparatus will return itself to its reference position automatically. When the disc 55 rotates approximately 180°, which corresponds to twenty revolutions of the input shaft, the pad 58 will make contact with one of the brushes 63 or 64 thereby energizing relay winding 88. This in turn will open the contacts 89 thereby opening the circuit to relay 83 thus energizing the motor 24 in exactly the same manner as if the stop push bottom 27 had been depressed.

It is therefore seen that the storage unit of the present invention is a highly satisfactory device. The entire mechanical unit occupies a space of approximately 2" by 2" by 1½". No difficult manufacturing operations are required and tests of a model have shown it to have extremely long life.

What is claimed is:

1. A mechanical unit for a rotary motion storage device comprising a first shaft for receiving the rotary motion to be stored, a worm fastened to said shaft, a second shaft, a worm gear fastened to said second shaft and engaging said worm, a cam having a flat portion carried by said first shaft, a slidable bar having a flat end cooperating with said cam, spring means having a dead center position for urging said bar toward or away from said cam, depending upon the position of said bar, said dead center position occurring at a position of said bar short of its maximum possible displacement by said cam, whereby a predetermined initial rotation of said first shaft causes said cam to force said bar away from said first shaft until said dead center position is passed whereupon said spring means snaps said bar out of engagement with said cam, and means responsive to the approach of said second shaft to a predetermined position for shifting said spring means over said dead center position so as to urge said bar toward said cam.

2. A mechanical unit for a rotary motion storage device comprising, a first shaft for receiving the rotary motion to be stored, a worm on said first shaft, a second shaft, a worm gear on said second shaft meshing with said worm, a flat portion on said first shaft constituting a first cam, a bar having a flat end and being slidable lengthwise toward and away from said first shaft to either of two extreme positions, the first position being with the flat end of the bar flush with said first cam and the second position being with the flat end of said bar at a distance from the center of said shaft greater than its radius, spring means for urging said bar from an intermediate dead center position toward either extreme position, said intermediate dead center position occurring with the flat end of said bar at a distance from the center of said first shaft less than its radius, whereby if said bar is in its first position, rotation of said first shaft forces said bar beyond its dead center position, a second cam carried by said second shaft, and means cooperating with said second cam for shifting said spring means over its dead center position so as to urge said bar toward said first position.

3. A mechanical unit for a rotary motion storage device comprising, a first shaft for receiving the rotary motion to be stored, a worm on said first shaft, a second shaft, a worm gear on said second shaft meshing with said worm, a flat portion on said first shaft constituting a first cam, a first bar having a flat end and being slidable lengthwise toward and away from said first shaft to either of two extreme positions, the first position being with the flat end of said first bar flush with said first cam and the second position being with the flat end of said bar at a distance from the center of said first shaft greater than its radius, over center spring means for urging said first bar from an intermediate dead center position toward either extreme position, said intermediate dead center position being with the flat end of said first bar at a distance from the center of said first shaft less than its radius, whereby if said first bar is in its first extreme position rotation of said first shaft forces said first bar beyond its dead center position whereupon it snaps to its second extreme position, a second cam rotated by said second shaft, and a second slidable bar one end of which is engaged by said second cam at a predetermined position of said second shaft and the other end of which cooperates with said over center spring mechanism whereby when said second cam engages said second bar, said spring mechanism is shifted over its dead center position so as to urge said first bar toward its first extreme position.

4. A mechanical unit for a rotary motion storage device comprising, a first shaft for receiving the rotary motion to be stored, a worm on said first shaft, a second shaft, a worm gear fastened to said second shaft and meshing with said worm, a flat portion on said first shaft constituting a first cam, a first bar having a flat end and being slidable lengthwise toward and away from said first shaft, a spring, a lever pivoted at a point between its ends and having its first end engaging said bar and its second end fastened to one end of said spring, the other end of said spring being fixed, whereby the spring acting through said lever urges said bar away from a dead center position to either of two extreme positions, the first position being with the flat end of said bar flush with said first cam and the second position being with the flat end of said bar at a distance from the center of said first shaft greater than its radius, said dead center position being with the flat end of said bar at a distance from the center of said first shaft less than its radius, whereby if said bar is in its first extreme position rotation of said first shaft forces said bar beyond its dead center position whereupon said spring snaps said bar to its second extreme position, a disc fastened to said second shaft, a protuberance constituting a second cam on one face of said disc, and a second bar slidable in a direction perpendicular to the face of said disc toward and away from said lever, the first end of said second bar being engaged by said cam at a predetermined angular position of said disc, whereby the second end of said second bar bears against said lever thereby forcing said lever, said spring and said first bar beyond said dead center position so as to urge said first bar toward said first extreme position.

References Cited in the file of this patent

UNITED STATES PATENTS

| | | |
|---|---|---|
| 2,746,318 | Benjamin | May 22, 1956 |
| 2,806,571 | Zeldman | Sept. 17, 1957 |
| 2,822,691 | Hyden | Feb. 11, 1958 |